United States Patent
Kracker et al.

(10) Patent No.: US 9,045,112 B2
(45) Date of Patent: Jun. 2, 2015

(54) ADJUSTABLE RAIN SENSOR SETTING BASED ON PROXIMITY VEHICLE DETECTION

(71) Applicants: Thomas G. Kracker, Marysville, OH (US); Brian K. Lickfelt, Powell, OH (US)

(72) Inventors: Thomas G. Kracker, Marysville, OH (US); Brian K. Lickfelt, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 118 days.

(21) Appl. No.: 13/917,991

(22) Filed: Jun. 14, 2013

(65) Prior Publication Data

US 2014/0265980 A1  Sep. 18, 2014

Related U.S. Application Data

(60) Provisional application No. 61/792,160, filed on Mar. 15, 2013.

(51) Int. Cl.
| | |
|---|---|
| *G05B 5/00* | (2006.01) |
| *H02H 7/08* | (2006.01) |
| *H02P 1/04* | (2006.01) |
| *H02P 3/00* | (2006.01) |
| *H02P 7/00* | (2006.01) |
| *B60S 1/08* | (2006.01) |

(52) U.S. Cl.
CPC ............ *B60S 1/0844* (2013.01); *B60S 1/0818* (2013.01)

(58) Field of Classification Search
CPC .... B60S 1/0818; B60S 1/0822; B60S 1/0833; E05F 15/2007; E05Y 2900/55
USPC ......................................... 318/483, 443–444
See application file for complete search history.

(56) References Cited

U.S. PATENT DOCUMENTS

| | | | |
|---|---|---|---|
| 5,896,018 A | 4/1999 | Pientka et al. | |
| 6,218,741 B1* | 4/2001 | Braun et al. | 307/10.1 |
| 6,269,308 B1* | 7/2001 | Kodaka et al. | 701/301 |
| 7,009,356 B2* | 3/2006 | Tanida | 318/483 |
| 7,415,338 B2* | 8/2008 | Monji et al. | 701/49 |
| 7,466,097 B2 | 12/2008 | Kokuryo et al. | |
| 7,772,793 B2* | 8/2010 | Ishikawa | 318/483 |
| 2013/0057397 A1* | 3/2013 | Cutler et al. | 340/435 |

* cited by examiner

*Primary Examiner* — Shawki S Ismail
*Assistant Examiner* — Bradley Brown
(74) *Attorney, Agent, or Firm* — Pearne & Gordon LLP

(57) ABSTRACT

A system for adjusting the wipers of a vehicle based on the use of rain and proximity detecting subsystem on a given vehicle for detecting the presence of rain and one or more other vehicles in proximity to the given vehicle, such that the wipers of the given vehicle can be automatically operated to better respond to material such as rain, snow, or other material being splashed on the given vehicle by the other vehicle(s). This system may utilize sensor subsystems used for other purposes for use as the proximity sensors.

18 Claims, 5 Drawing Sheets

ADJUSTABLE RAIN SENSOR SETTING BASED ON PROXIMITY VEHICLE DETECTION

CROSS-REFERENCES TO RELATED APPLICATIONS

This application claims the benefit of U.S. provisional application Ser. No. 61/792,160, filed on Mar. 15, 2013, and incorporated herein by reference.

BACKGROUND

This application relates generally to sensors on a vehicle, and more specifically to rain and proximity sensors on a given vehicle that detect the presence of rain and another vehicle in proximity to the given vehicle and adjust the action of windshield wipers to address material that may be splashed on the given vehicle by the other vehicle.

Rain sensors are being provided on vehicles for a number of purposes, including automatically turning on wipers when rain is detected, and adjusting the speed of the wipers based on the amount of rain that is detected. Rain sensors are particularly popular on luxury vehicles. However, the presence of other nearby vehicles can cause problems in using rain sensors to automatically control wipers in some situations. For example, problems can occur when a given vehicle with rain sensors is passing or following other vehicles that are in adjacent lanes, or when the given vehicle is behind another vehicle, or when other vehicles pass the given vehicle, or even when the given vehicle is approached by an oncoming vehicle. In such situations, rain water (or in some cases melted snow, mud, or other material) is often splashed by the adjacent or preceding vehicle from the roadway, or off of the other vehicle itself, onto the windshield (and other surfaces) of the given vehicle, potentially causing momentary blindness due to the heavier than anticipated amount of water (or snow or slush) overwhelming the current wiper setting, and thus potentially leading to an unsafe condition. Reaction time of current automatic wiper systems tend to be set to avoid oversensitivity so as to not change wiper speeds when not necessary, often leading to a lag in reaction to such splashing that exacerbates the problem.

SUMMARY

Provided are a plurality of example embodiments, including, but not limited to, a system for adjusting the wipers of a vehicle based on the use of rain and proximity detecting subsystem on a given vehicle for detecting the presence of rain and one or more other vehicles in proximity to the given vehicle, such that the wipers of the given vehicle can be automatically operated to better respond to material such as rain, snow, or other material being splashed on the given vehicle by the other vehicle(s). This system may utilize sensor subsystems used for other purposes for use as the proximity sensors.

Also provided is a system for automatically adjusting operation of wipers of a controlled vehicle, comprising: a controller; a rain detector adapted for detecting the presence of rain or other material obstructing a view of a driver of the controlled vehicle; one or more proximity detectors for detecting a proximity of one or more other vehicles to the given vehicle, wherein the one or more proximity detectors notify the controller of the other vehicles being in proximity to the given vehicle; and a wiper subsystem including the wipers adapted for adjusting operation of the wipers. The controller of this system is adapted to control the wiper subsystem to adjust the operation of the wipers based on the detected proximity of at least one of the other vehicles to the given vehicle when the rain detector has detected the presence of rain or other material.

Still further provided is a system for automatically adjusting operation of wipers of a controlled vehicle, comprising: a controller; a rain detector adapted for detecting the presence of rain or other material obstructing a view of a driver of the controlled vehicle; one or more proximity detectors for detecting a proximity of one or more other vehicles to the given vehicle, wherein the one or more proximity detectors notify the controller of the other vehicles being in proximity to the given vehicle; and a wiper subsystem including the wipers adapted for adjusting operation of the wipers. The controller is adapted to control the wiper subsystem to increase the speed of the wipers when the detected proximity of at least one of the other vehicles to the given vehicle is relatively closer when the rain detector has detected the presence of rain or other material, and, the controller is further adapted to control, subsequent to increasing the speed of the wipers based on the detected proximity, the wiper subsystem to decrease the speed of the wipers when the detected proximity of the at least one of the other vehicles to the given vehicle has changed.

Further provided is a method for adjusting the operation of wipers of a given vehicle, comprising the steps of:
   automatically detecting the presence of rain or other material obstructing the view of a driver of the given vehicle;
   automatically setting the operation of the wipers of the given vehicle based on the detected presence of rain or other material;
   automatically detecting the presence of one or more other vehicles in a vicinity of the given vehicle; and
   automatically adjusting the operation of the wipers of the given vehicle based on the detected presence of the one or more other vehicles in the vicinity of the given vehicle, such that the operation of the wipers is different than if the one or more other vehicles had not been detected in the vicinity of the given vehicle.

Also provided are any of the above embodiments or other embodiments where one or more proximity detectors uses a sensor adapted for detecting light for detecting the proximity of other vehicles, and/or where one or more proximity detectors uses a video camera for detecting the proximity other vehicles, or where one or more proximity detectors uses a laser or radar subsystem for detecting the proximity of other vehicles.

Also provided are additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE EXAMPLE EMBODIMENTS

Rain sensors are being provided on a number of vehicles, and in particular on luxury vehicles. The main function of such rain sensors is to detect the existence and intensity of rain, resulting in outputting a message to be provided to a vehicle controller for use in automatically controlling the operation of the controlled vehicle's windshield wipers. For example, the vehicle controller may select a wiping mode of a wiper based on a detected raindrop amount.

Also being provided in some vehicles are means of detecting and/or observing other vehicles that are in proximity to a given vehicle. For example, Honda U.S. Pat. No. 7,415,338 (Apparatus for Controlling Auxiliary Equipment of Vehicle, hereinafter the '338 reference), incorporated herein by reference, discloses an apparatus that controls the operation of auxiliary equipment of a controlled vehicle by receiving an output of a surroundings detection sensor and an output of a vehicle information sensor. The apparatus determines the distance to and the direction of an overtaking vehicle, an oncoming vehicle, or a preceding vehicle, and independently controls accessories, such as the light intensities of the headlamps. The surroundings detection sensor may be any sensor which can detect the condition around the controlled vehicle (i.e., conditions in proximity to the vehicle), such as an imaging device, a radar device, a photoelectric sensor, or a combination of such sensors.

For example, the '338 reference discloses an imaging device for imaging an overtaking vehicle, an oncoming vehicle, a preceding vehicle, and the road ahead; detecting the distance to the other vehicle, the direction of the other vehicle, the condition ahead of the controlled vehicle, brightness ahead and around the controlled vehicle, etc.; and further imaging the state of the windshield glass and detecting the state of raining and mist on the windshield by using an image recognition processing. Various devices can be independently controlled based on monitoring the distance to other vehicles, the direction of other vehicles, and/or the brightness ahead or surrounding the controlled vehicle. The operation speed and intermittence time of the vehicle wipers, for example, are controlled by the rain amount detected by image recognition processing.

Proximity detector subsystem(s) can utilize any subsystem or plurality of subsystems which can detect the condition around the controlled vehicle for the purpose of identifying other vehicles, their distances/location, and in some cases their speeds. For example, proximity detection may utilize an imaging device, a radar device, a photoelectric sensor, one or more video cameras, motion detectors, or any combination of these items for this purpose. One or more of the proximity subsystems, or other subsystems, might also detect the state of raining and mist on the wind shield.

Figure 1:
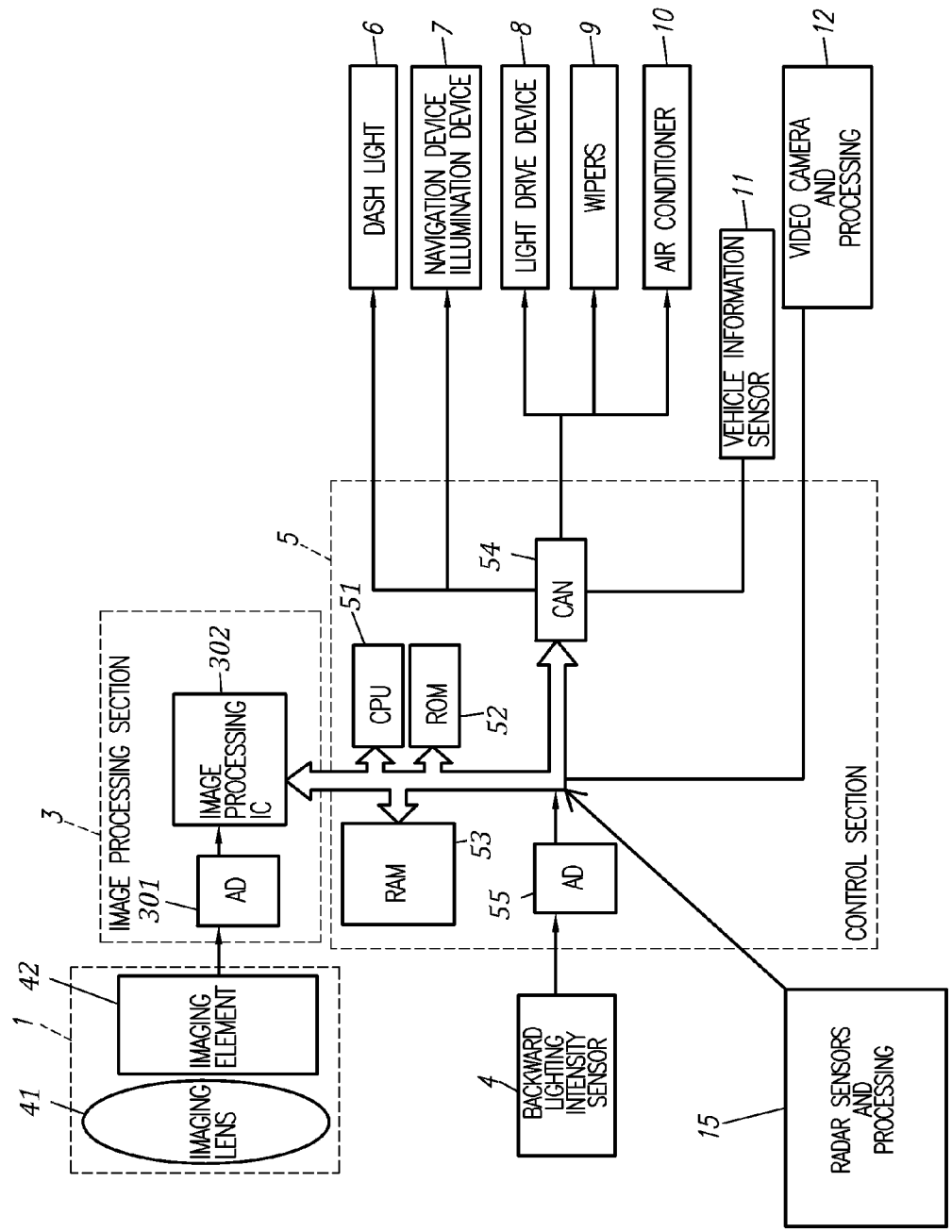
FIG. 1 shows a schematic of an example system that can provide a wiper adjustment feature for a controlled vehicle.

FIG. 1 shows a schematic of an example system that can provide an instant wiper adjustment feature for a controlled vehicle (discussed in more detail, below). FIG. 1 shows a system including a plurality of example proximity detectors. For example, shown is an imaging subsystem 1 with an image processing section 3, radar sensors and their accompanying processing components 15, and a video subsystem 12. The example system of FIG. 1 also includes a backward lighting intensity sensor 4 for detecting the luminance backward of a vehicle, a control section 5, a dash light 6, a navigation device illumination device 7, a light drive device 8, wipers 9, an air conditioner 10 including a defroster, and a vehicle information sensor 11 recognizing operation of the controlled vehicle.

The example imaging device 1 of FIG. 1, includes an imaging lens 41 and an imaging element (e.g., a CCD: Charge Coupled Device) 42. The image processing section 3 includes an AD (Analog-to-Digital) converter 301 and an image processing IC (Integration Circuit) 302 for communicating with the control section 5. The radar system 15, when utilized, can include one or more radar transmitter/receivers (typically provided in the front, the rear, or both front and rear of the vehicle) along with associated processing equipment for communicating with the control section 5. The video system 12, when utilized, can include one or more video cameras (typically provided in the back, and/or the front of the vehicle) along with their associated processing circuitry for communicating with the control section 5.

Other subsystems for monitoring proximity using different sensors can be added in addition to, or instead of, any of these subsystems, such as subsystems using sonar transceivers, infrared detectors, laser transceivers, motion detectors, light detectors, sound detectors, or any other suitable technology that can be used to detect objects in the proximity of a vehicle. Any one or more of these subsystems in any desirable combination, along with any desirable processing circuitry, can be adapted to detect surroundings of the controlled vehicle for use as proposed below to detect other vehicles The example control section 5 of FIG. 1 includes a controller (CPU) 51, a ROM (Read Only Memory) 52, a RAM (Random Access Memory) 53 a communication circuit (CAN: Control Area Network) 54, an AD (Analog-Digital) converter 55 and may include a DA (Digital-to-Analog) converter (not shown) where necessary for controlling analog equipment. Auxiliary equipment 6, 7, 8, and 10 can be controlled by the control section 5 via the CAN 54 or by other connections that may be digital or analog, but in this particular example the wipers 9 can be controlled via the CAN 54, as described in more detail hereinbelow, although other control means are also contemplated.

The proximity sensors utilized by any of the various proximity subsystems are typically arranged at appropriate positions around the controlled vehicle for detecting and determining the proximity (which may include location, speed, distance, size, etc.) of other vehicles in relation to the controlled vehicle. Thus, the proximity sensors are arranged to detect an overtaking vehicle, an oncoming vehicle, a preceding vehicle, and adjacent vehicle, and the road ahead. Where desirable, the proximity sensors may also detect any of: the distance to the other vehicle(s), the direction of the other vehicle(s), the speed of the other vehicle(s), the road and/or weather condition ahead and around the controlled vehicle, and the like through the use of the proximity subsystems utilizing the data provided by the proximity sensors for feeding proximity information to the control section 5 for use and/or interpretation.

With respect to detecting other vehicles, it is useful for the controlled vehicle to be able to detect the presence of, and preferably also the distance from, other vehicles that may be found at the four corners of the controlled vehicle, in order to detect all of the situations where another vehicle may be approaching, or leaving, the proximity of the controlled vehicle, and thus potentially impact the controlled vehicle driver visibility due to substance splashing on the controlled vehicle, as discussed below. In some instances, this can be done by detecting the locations of the other vehicles, and also detecting their distances, and in some cases detecting their velocities directly, or calculating their velocities based on their changing positions, to predict future positions of those other vehicles. It is noted that there are potentially many different ways to determine this information using any of the variety of proximity detectors described above, along with other ways of doing so. In any case, it is desired to gather sufficient information from the proximity subsystems in order to predict when the other vehicles are causing, or may soon cause, a problem for the controlled vehicle with respect to windshield wiper operation, in which case the wiper operation can be adjusted to preempt, or quickly respond to, that problem by adjusting the wiper operation in the proper manner.

Figure 4:
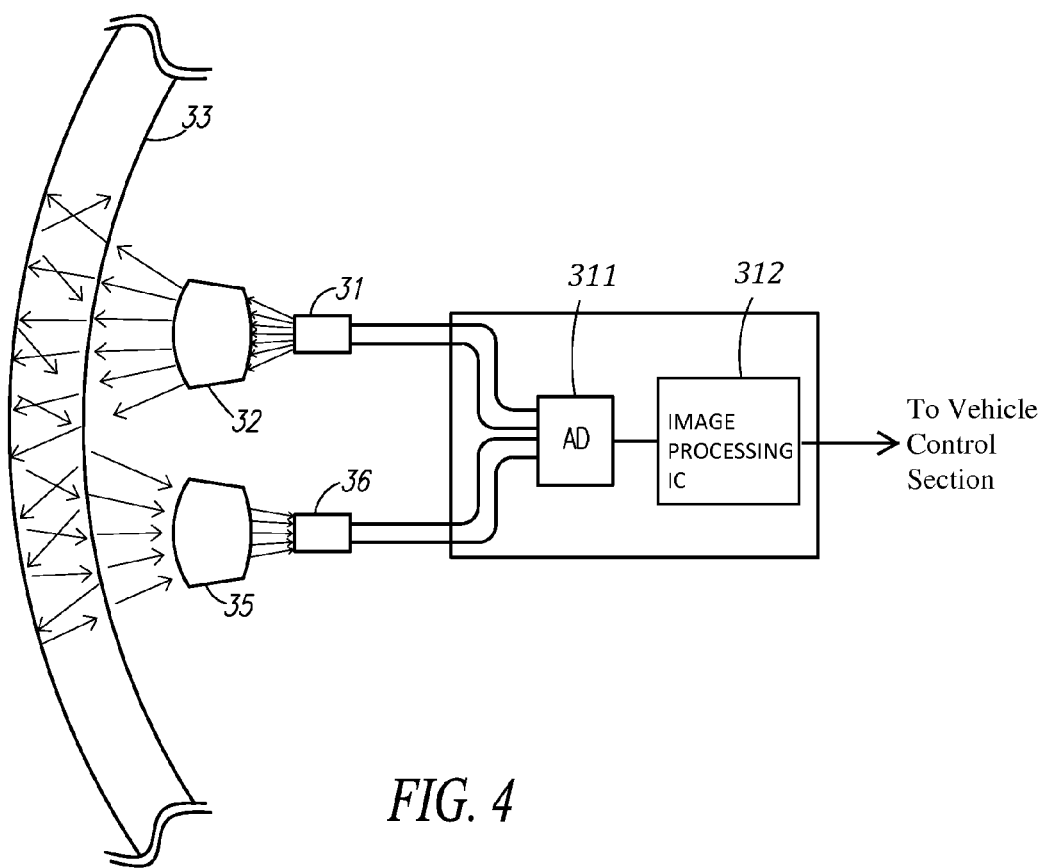
FIG. 4 shows a schematic of an example rain detection subsystem that can be used with the example embodiments.

FIG. 1 shows one example arrangement for a rain detection system using the imaging subsystem 1 with an image processing section 3, as described above. The schematic of FIG. 4 shows another example rain detection system using active transducers, for example. In FIG. 4, one or more infrared (IR) LEDs 31 are used as light transducers to spread light through a lens 32, which is then reflected and refracted within the controlled vehicle windshield (or other window) 33, with another lens 35 focusing reflected and refracted light back from the windshield into an IR detector 36. In some embodiments, the lenses 32, 35 may not be necessary, with the LED 31 and the detector 36 directly emitting and sensing the light, respectively. Furthermore, the IR LED and/or detector 36 might be located remotely from the windshield 33, such as by using fiber optics to transmit the light to or from the devices, for example.

For the subsystem of FIG. 4, when raindrops are present on the windshield 33, the raindrops introduce a different index of refraction than the external air does on the windshield. This changes the amount and/or characteristics of IR energy entering the detector 36. This information is sampled, which might utilize an analog to digital controller 311 connected to an Image Processing IC 312, which can be used by a vehicle information system, such as the control section 5 of FIG. 1, to determine when the vehicles wipers should be activated or deactivated, and at what speed they should be operated (based on the quantity of rain on the windshield), whenever the rain detecting mode is active. As an alternative, the functions of the image processing section 3 might be incorporated into the control section 5, if desired, or only the IR detector 36 may connect to the IC 312 for processing the result, with the LED being directly controlled by the control section, or merely turned on and off as a vehicle accessory. Alternatively, the rain sensing could also be done by other methods as well (e.g., using any one or more of the proximity detection approaches discussed above).

As described above, for at least some applications the rain detection algorithm used to determine when the wipers should be activated and at what speed may not always react fast enough in all circumstances to ensure good visibility. Hence, the threshold(s) for activating the wipers or changing their speed can be adjusted based on the detected vehicle proximity (e.g., shortening the threshold time or increasing the sensitivity threshold) so that the wiper control reacts faster when vehicles are detected in proximity, but only as needed by the detected proximity. For example, when driving behind other vehicles or passing them on the left or right, the problems of material being splashed onto the controlled vehicles windshield, as discussed above, can occur. When another vehicle passes the controlled vehicle, or is passed by the controlled vehicle, for example, a greater amount of water (or other material) could be splashed on the windshield of the controlled vehicle by the other vehicle. As discussed above, this can briefly create a low visibility condition. However, in traditional systems, if the rain-detecting setting were changed to be more sensitive (such as by more quickly reacting to detected changes in the detected rain, or being more sensitive to the amount of rain), then the wipers could potentially activate more often than desired (high mode too often), especially under normal conditions with no preceding vehicles present during normal rain. Such improper settings cause their own problems, including visibility issues and wiper wear issues. Hence, it is often desirable not to make the rain detection system too sensitive or have it react too quickly.

Figure 2A:
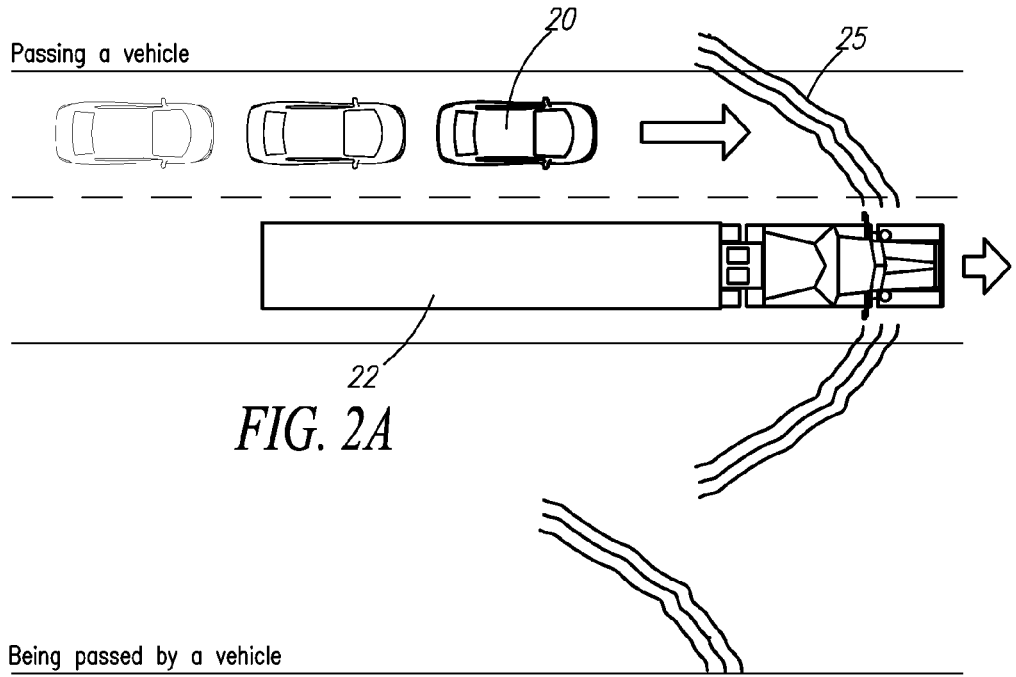
FIGS. 2A-2C illustrate example splash zones of another vehicle in proximity to the controlled vehicle.
Figure 2B:
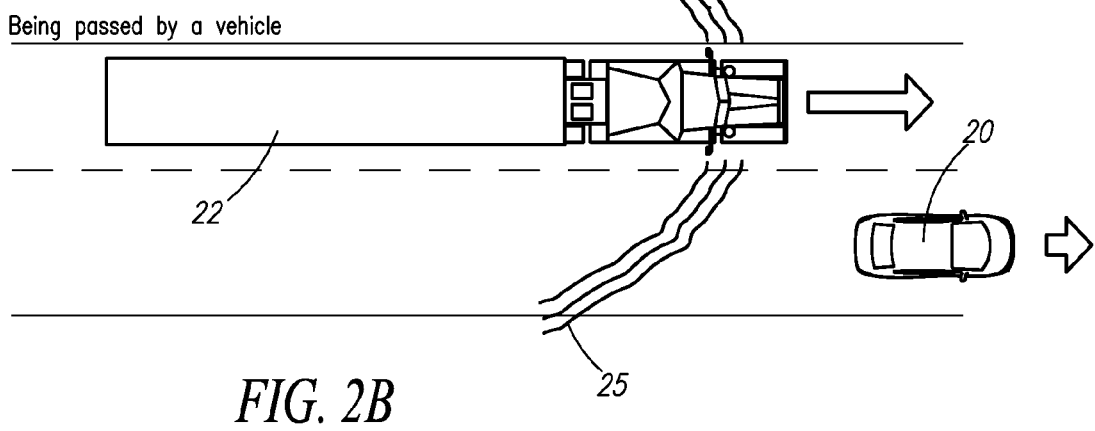
Figure 2C:
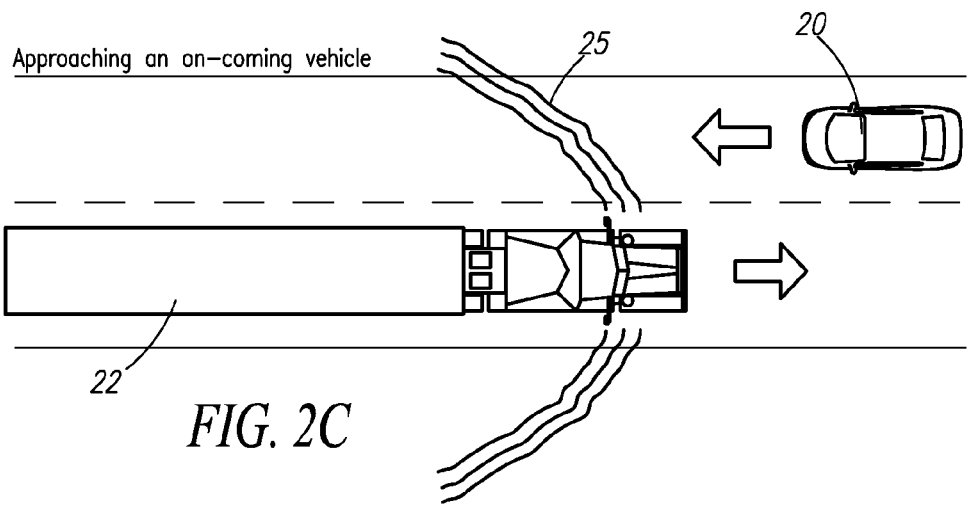

As discussed, there are a number of circumstances where a given vehicle with automatic rain sensors could be impacted by other vehicles traveling in the vicinity. A few of these circumstances are shown in FIGS. 2A, 2B, and 2C. For example, as shown in FIG. 2A, when the controlled vehicle 20 is traveling during a rain or snow shower, the controlled vehicle 20 may pass another vehicle 22, where the other vehicle 22 is splashing rainwater, slush, melted snow, mud, etc. from the roadway onto the controlled vehicle 20, as shown by the splash zone 25 formed on both sides of the vehicle 22. Or, as shown in FIG. 2B, the controlled vehicle 20 may be passed by the other vehicle 22 in a similar manner, with splash zone 25. Or, the controlled vehicle 20 might be approaching the other vehicle 22 from the opposite direction in opposing lanes, as shown in FIG. 2C. Or any combination of these may occur at the same time, or in any sequence, involving multiple vehicles. This is particularly a problem when an automobile is passing (or being passed by) a larger vehicle with larger wheels and more surface area, such as when the other vehicle is a semi-tractor/trailer, a snow plow, or another large vehicle, any of which tend to splash and deflect large amounts of material from the roadway and surrounding area onto adjacent vehicles, potentially causing temporary, but potentially drastic, visibility problems.

Generally, the controlled vehicle 20 can be adapted to utilize any of the plurality of different types of proximity sensing solutions that may be currently used to monitor an area around the vehicle for detecting objects found around the vehicle 20. Examples of such systems were described in detail above. Because different vehicles may be using different proximity subsystems for a variety of different purposes, it is desirable to design an approach that can utilize any of these subsystems that may be already present on a vehicle to support the desired enhanced wiper control.

Because it may be preferable to adjust the wiper speed more than once, in different circumstances, and/or to anticipate the arrival of the other vehicle(s) in advance in order to prepare for the wiper adjustment before it is needed, it is useful if it can also be determined, to some extent, the distances or relative speeds between the controlled vehicle 20, the other vehicle 22, and any additional vehicles being monitored. This can be done, for example, by monitoring the other vehicle(s) 22 through the use of detection zones virtually arranged around the controlled vehicle 20.

Figure 3A:
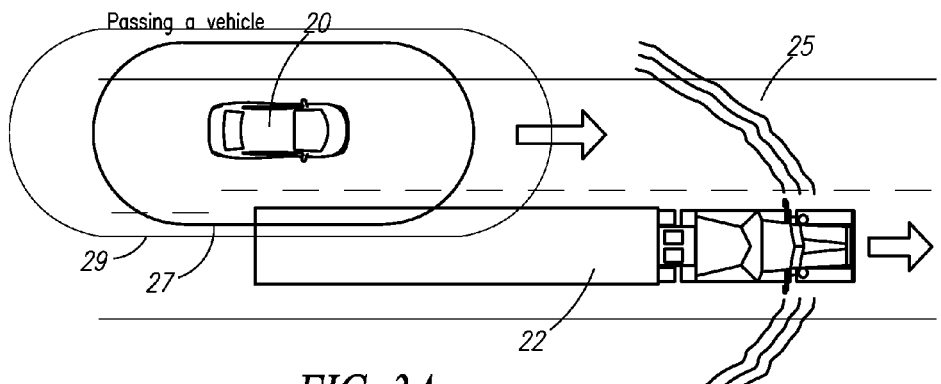
FIGS. 3A-3C illustrate example proximity zones of the controlled vehicle in proximity to another vehicle for an example embodiment.
Figure 3B:
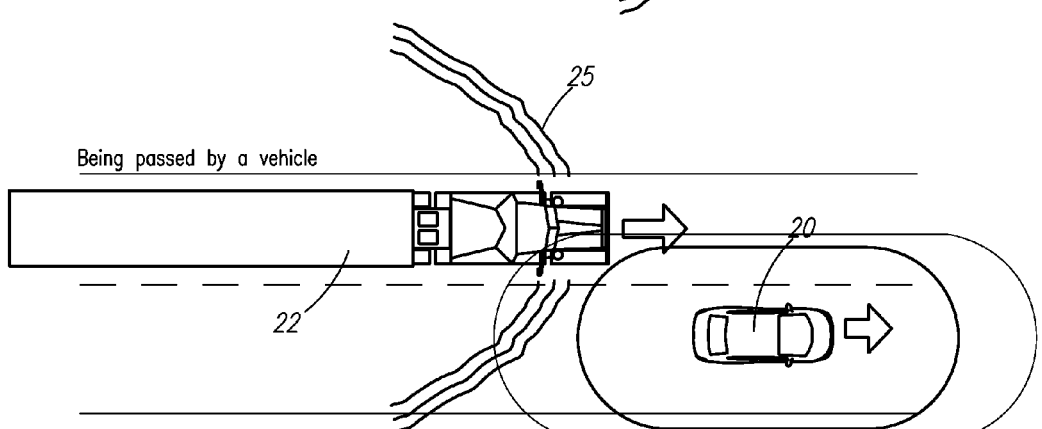
Figure 3C:
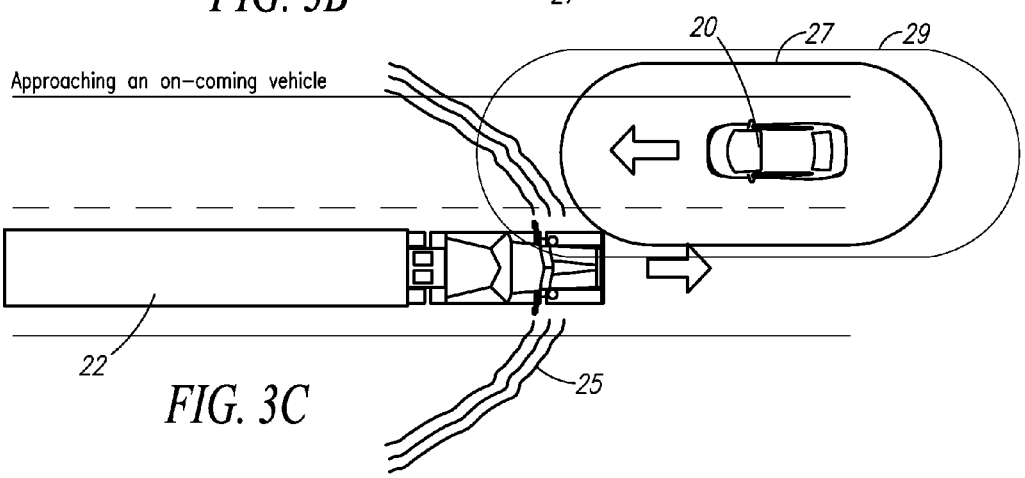

Hence, for at least some embodiments, it is useful to define such detection zones around the vehicle 20 for detecting the presence of other vehicles in the vicinity by using the proximity sensors that may already be provided on the vehicle 20 for other purposes (such as proximity detection for parking, security, safety, etc.). FIG. 3A shows the controlled vehicle 20 having two zones, a smaller zone 27 operating within a larger zone 29, for detecting another vehicle 22 in the situation where the controlled vehicle 20 is passing vehicle 22. FIG. 3B shows such zones provided in the situation where the controlled vehicle 20 is being passed by vehicle 22, and FIG. 3C shows the situation where the controlled vehicle 20 is approaching oncoming vehicle 22. In all of these examples, the vehicle 20 may first detect vehicle 22 via detection zone 29, and then determine that vehicle 22 is closer via detection zone 27.

The sizes of these zones can be chosen based on the size of the controlled vehicle 20, its speed, the size of the roadway, the type of highway, or other factors, and the sizes of the zones might be made variable based on such factors as well. Furthermore, using more than two zones might provide other benefits. In addition, the zones can be used both to determine when a vehicle is approaching (e.g., detecting a transition from zone 29 to zone 27), or to determine when a vehicle is receding (e.g., detecting a transition from zone 27 to zone 29). Furthermore, detecting when vehicles enter the various zones can be used to calculate the vehicle's velocity, and position, as well, when the sizes of the zones (or location of the zone borders) are known.

The detection zones operate by detecting the approximate distance to the other vehicles using the existing vehicle proximity sensors, and a vehicle control subsystem that would then execute one or more programs executing on a vehicle processor to create the zones and detect vehicles within them. An example of such a system was described above with respect to FIG. 1, which can be adapted to support this zoning approach by properly programming the CPU and, where desirable, updating proximity subsystem processing as well. Such zones can also be utilized to determine automatic wiper subsystem operating modes, such as whether the controlled vehicle should be operating in a normal mode for typical operation, or in a higher sensitivity mode to prepare it for responding more quickly to water splash than it is currently responding to normal rainfall changes.

Generally, as discussed above, it is preferable to use proximity subsystems that are already available on many automobiles for any of a number of features, for providing the improved rain sensing and splash protection. For example, radar systems such as may be used in existing Adaptive Cruise Control (ACC), or a forward facing camera from some another system, like Lane Departure Warning (LDW), could be utilized in the vehicle models where available.

As also discussed above, because the rain detection algorithm that may be currently used to determine when and how the wipers should be activated may not always react sufficiently fast enough to respond to splashing situations, it is desirable that a balance between normal operation and some higher sensitivity setting(s) be achieved using a new algorithm, implemented by a computer program executing on a vehicle controller (e.g., FIG. 1 CPU 51), which will utilize the information provided by the existing (or alternatively from newly added) proximity subsystems, such as those discussed above, for detecting the vehicles, such as by using the above identified zone approach.

Such new algorithm(s) would be adapted to detect if there is a vehicle in proximity or not that may require adjusting the wiper operation, based on an analysis of the data from the proximity sensors. For example, when a vehicle enters zone 1, the system can enter a mode (e.g., higher sensitivity) to either watch for the same vehicle entering zone 2, or to monitor for the occurrence of the splash itself, in which for either case, the wipers operation will be adjusted to accommodate the splashing of material onto the windshield (e.g., by increasing wiper speed).

For example, the system can start in a normal, lower sensitivity mode, such as when the system detects no other vehicle in proximity, or after some timeout after another vehicle detected in zone 1 has not entered zone 2, or when another vehicle is detecting leaving zone 2. But when the system detects that the controlled vehicle is approaching, or being approached by, another vehicle in close proximity (such as by monitoring zone 1 and detecting the vehicle), the controller, executing the new algorithm, could, for example, alert the rain sensor subsystem to be temporarily in a higher sensitivity mode to allow it to react much quicker if water splash is then detected (such as via the rain sensor). This higher sensitivity mode is only maintained as long as the other vehicle(s) are in close proximity, and when the other vehicle(s) is no longer detected, or when it is determined to be receding, the automatic wiper system sensitivity can be returned to the normal, lower sensitivity. Note that such an approach might use only one zone, or it can use multiple zones to further change sensitivity, making the wiper systems more and more sensitive to rain changes as the other vehicles come closer and closer.

Alternatively, the controller may itself determine when the wiper speed should be adjusted by detecting in which zone the vehicle in proximity is found (i.e., adjusting the wiper by detecting the vehicle in zone 2), and perhaps even by detecting the splash of material itself using one or more additional sensors other than the rain sensor, if desired. In such cases, the vehicle control system can determine when the other vehicles are approaching or receding, and how close the other vehicles are, by monitoring the transitions between the zones to calculate direction, speed, and distance, for example.

Approximate distance detection (such as by determining which in zone(s) the other vehicle(s) are detected, and when, or by monitoring velocity) can even be used to accurately "predict" when greater water splash might occur, allowing the wiper to be adjusted just in advance of the splash, avoiding any period of low visibility. This will help the customer to see better sooner, while not feeling overwhelmed by the wipers being in high mode more often than necessary (which can cause its own problems, as discussed above). For any of these examples, in addition to the vehicle control system detecting the other vehicle(s) in proximity, the control system may be used to detect the amount of rain or other material being splashed on the windshield (or other windows), and/or detect the speed and/or changes in distance or location of the other vehicle(s), and/or detect other characteristics in order to adjust the wipers for maximum visibility, as discussed above.

Figure 5:
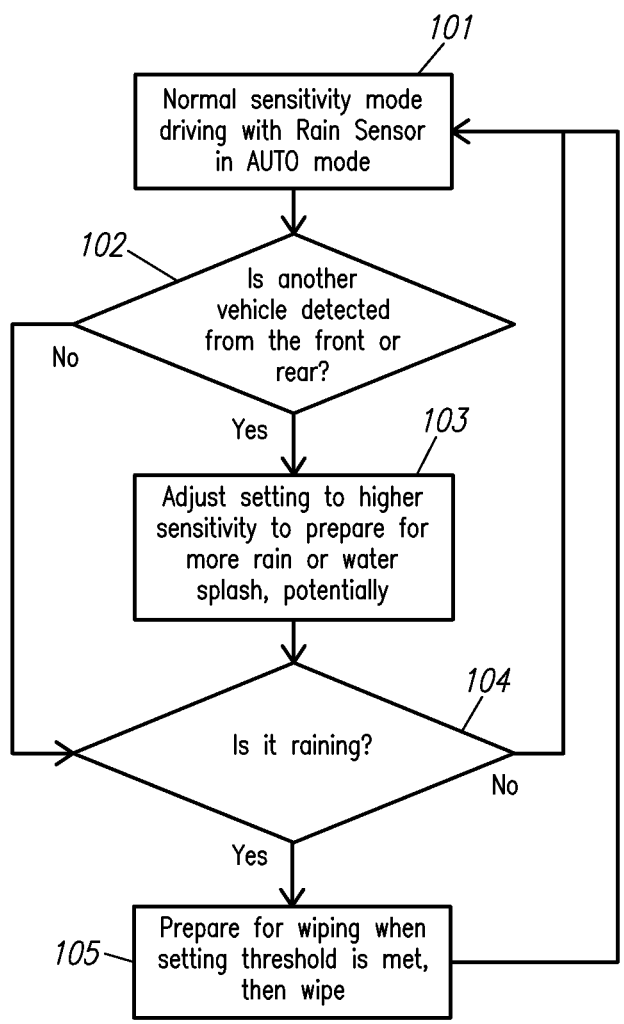
FIG. 5 is a flow chart showing an example control algorithm for an example embodiment.

The flow chart of FIG. 5 shows an example of one such new algorithm that may be used for implementing the wiper speed splash adjustment. In this example, the system starts out in normal mode 101 with the rain detector subsystem in auto mode. It is detected 102 when another vehicle is approaching (or being approached) from the front or the rear directions (e.g., detect entering zone 1), in which case the rain detector subsystem (or the control system) is set to higher sensitivity mode 103. It is detected if it is raining 104, in which case the algorithm monitors for a threshold being met 105 in which case the wiper is adjusted.

If desired, the algorithm can be modified to monitor for transitions of surrounding vehicles from one zone to another. In either case, among others, the wiper system can transition back to a normal mode when it detects a larger distance to the preceding vehicle, or a reduction in the amount of rain or other material being splashed on the windshield, for example. Alternative algorithms could instead be utilized, or combinations of these alternatives, as desired, any of which may offer different benefits and shortcomings.

Finally, it is noted that in most situations, the response of the system in preparing for, predicting, or detecting, the splash of material from the other vehicle(s) will be to increase the speed of the wipers in order to handle the increased material. This increase may be to a maximum rate, or a rate that depends on other detected criteria, such as the amount of splashed material, or the rain density, or the amount of material on the roadway, for example. In some cases, it may be determined that a spray of the windshield washer is also to be provided, such as in situations where it is mud that is splashed, or to wash out a salt film forming on the windshield from evaporating salty road material (e.g., melted snow) that was splashed on the windshield. For example, a sudden decrease in detected light through the windshield by the subsystem of FIG. 4, even when the wipers are acting at the maximum rate, may indicated that such a spray is desirable, and/or the presence of vehicles in proximity may also indicate that such a spray is desirable, in particular where mud and snow are detected.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A system for automatically adjusting operation of wipers of a given
    vehicle, comprising:
a controller;
a rain detector adapted for detecting the presence of rain
    and other water based materials obstructing a view of a
        driver of the given vehicle;
    at least one proximity detector configured to detect a proximity of at least one other vehicle to the given vehicle,
        wherein the proximity
detector notifies the controller of the other vehicle being in proximity
to the given vehicle; and
    a wiper subsystem including the wipers adapted for adjusting operation of the wipers, wherein
    the controller is adapted to control the wiper subsystem to adjust the operation of the wipers based on the detected proximity of the at
least one other vehicle to the given vehicle when the rain detector
has detected the presence of rain and other water based materials; wherein
    the controller is adapted to have the wider subsystem adjust the operation of the wipers in response to determining that the proximity of the at least one of the other vehicles has become relatively closer to the given vehicle.

2. The system of claim 1, wherein the controller is adapted to have the wiper subsystem adjust the operation of the wipers using a different sensitivity mode, such that the wipers are operated differently to the detection of the presence of rain and other water based materials than when the wiper subsystem is not in the different sensitivity mode.

3. The system of claim 2, wherein the controller is adapted to have the wiper subsystem adjust the operation of the wipers in response to one or more of the proximity detectors detecting a change in the proximity of the at least one of the other vehicles.

4. The system of claim 1, wherein the controller is adapted to have the wiper subsystem further adjust the operation of the wipers in response to determining that the proximity of the at least one of the other vehicles has become relatively further away from the given vehicle.

5. The system of claim 1, wherein the operation of the wipers of the wiper subsystem is adjusted by the wiper subsystem to a faster wipe speed based on the detected proximity becoming relatively closer to the given vehicle.

6. The system of claim 5, wherein the operation of the wipers of the wiper subsystem is adjusted by the wiper subsystem from the faster wipe speed to a slower wipe speed based on the detected proximity becoming relatively further away from the given vehicle.

7. The system of claim 1, wherein the controller is adapted to have the wiper subsystem further adjust the operation of the wipers of the wiper subsystem based on a change to the detected proximity of the at least one of the other vehicles to the given vehicle.

8. The system of claim 1, wherein at least one of the one or more proximity detectors uses a sensor adapted for detecting light for detecting the proximity of the one of the one or more other vehicles.

9. The system of claim 1, wherein at least one of the one or more proximity detectors uses a video camera or a laser or radar subsystem for detecting the proximity of the one of the one or more other vehicles.

10. The system of claim 9, wherein said controlled vehicle is adapted for also using said video camera or said laser or radar subsystem for functions other than adjusting the operation of the wipers.

11. The system of claim 1, further comprising a windshield washer subsystem, wherein the controller is further adapted to control a spray of the windshield washer subsystem based on the presence of rain and other water based materials.

12. The system of claim 11, wherein the controller is further adapted to control the spray of the windshield washer subsystem based on the detected proximity of the at least one other vehicle to the given vehicle.

13. A system for automatically adjusting operation of wipers of a controlled vehicle, comprising:
    a controller;
    a rain detector adapted for detecting the presence of rain and other water based materials; one or more proximity detectors configured to detect a proximity of at least one other vehicle to the controlled vehicle, wherein the one or more proximity detectors notify the controller of the at least one other vehicle being in proximity to the controlled vehicle; and a wiper subsystem including the wipers adapted for adjusting operation of the wipers, wherein the controller is adapted to adjust the operation of the wiper in response to the rain detector detecting the presence of rain, wherein the controller is also adapted to control the wiper subsystem based on the detected presence of the at least one vehicle in the vicinity of the
    given vehicle, such that the operation of the wipers is different than
    if the at least one vehicle had not been detected in the vicinity of the given vehicle; and wherein to increase the speed of the wipers when the detected proximity of the at least one other vehicle to the given vehicle is relatively closer when the rain detector has detected the presence of rain and other water based materials.

14. The system of claim 13, wherein the at least one proximity detector uses a sensor adapted for detecting light for detecting the proximity of the at least one other vehicle.

15. The system of claim 13, wherein the at least one proximity detector uses a video camera or a laser or radar subsystem for detecting the proximity of the at least one other vehicle.

16. The system of claim 15, wherein said controlled vehicle is adapted for also using said video camera or the laser or radar subsystem for functions other than adjusting the operation of the wipers.

17. The system of claim 13, wherein the controller is further adapted to, subsequent to increasing the speed of the wipers based on the detected proximity, control the wiper subsystem to decrease the speed of the wipers when the detected proximity of the at least one other vehicle to the given vehicle has changed.

18. A method for adjusting operation of wipers of a given vehicle, comprising the steps of: automatically detecting the presence of rain and other water based materials; automatically setting the operation of the wipers of the given vehicle based on the detected presence of rain and other water based materials; automatically detecting the presence of one or more other vehicles in a vicinity of the given vehicle; and automatically adjusting the operation of the wipers of the given vehicle based on the detected presence of the one or more other vehicles in the vicinity of the given vehicle, such that the operation of the wipers is different than if the one or more other vehicles had not been detected in the vicinity of the given vehicle; wherein the controller is adapted to have the wiper subsystem adjust the operation of the wipers in response to determining that the proximity of the at least one of the other vehicles has become relatively closer to the given vehicle; and to increase the speed of the wipers when the detected proximity of the at least one other vehicle to the given vehicle is relatively closer when the rain detector has detected the presence of rain and other water based materials.

\* \* \* \* \*

UNITED STATES PATENT AND TRADEMARK OFFICE
CERTIFICATE OF CORRECTION

PATENT NO. : 9,045,112 B2
APPLICATION NO. : 13/917991
DATED : June 2, 2015
INVENTOR(S) : Kracker It is certified that error appears in the above-identified patent and that said Letters Patent is hereby corrected as shown below:

In the claims

Claim 1, Column 9, Line 31, should read:

A system for automatically adjusting operation of wipers of a given vehicle, comprising:
a controller;
a rain detector adapted for detecting the presence of rain and other water based materials obstructing a view of a driver of the given vehicle;
one or more proximity detectors configured to detect a proximity of at least one other vehicle to the given vehicle, wherein the one or more proximity detectors notify the controller of the other vehicle being in proximity to the given vehicle; and
a wiper subsystem including the wipers adapted for adjusting operation of the wipers, wherein the controller is adapted to control the wiper subsystem to adjust the operation of the wipers based on the detected proximity of the at least one other vehicle to the given vehicle when the rain detector has detected the presence of rain and other water based materials; wherein
the controller is adapted to have the wiper subsystem adjust the operation of the wipers in response to determining that the proximity of the at least one other vehicle has become relatively closer to the given vehicle.

Claim 3, Column 9, Line 63, should read:

The system of claim 2, wherein the controller is adapted to have the wiper subsystem adjust the operation of the wipers in response to the one or more proximity detectors detecting a change in the proximity of the at least one other vehicle.

Signed and Sealed this
Tenth Day of May, 2016

Michelle K. Lee
*Director of the United States Patent and Trademark Office*

Claim 4, Column 10, Line 1, should read:

The system of claim 1, wherein the controller is adapted to have the wiper subsystem further adjust the operation of the wipers in response to determining that the proximity of the at least one other vehicle has become relatively further away from the given vehicle.

Claim 7, Column 10, Line 16, should read:

The system of claim 1, wherein the controller is adapted to have the wiper subsystem further adjust the operation of the wipers of the wiper subsystem based on a change to the detected proximity of the at least one other vehicle to the given vehicle.

Claim 8, Column 10, Line 21, should read:

The system of claim 1, wherein at least one of the one or more proximity detectors uses a sensor adapted for detecting light for detecting the proximity of the at least one other vehicle.

Claim 9, Column 10, Line 25, should read:

The system of claim 1, wherein at least one of the one or more proximity detectors uses a video camera or a laser or radar subsystem for detecting the proximity of the at least one other vehicle.

Claim 10, Column 10, Line 29, should read:

The system of claim 9, wherein the given vehicle is adapted for also using said video camera or said laser or radar subsystem for functions other than adjusting the operation of the wipers.

Claim 13, Column 10, Line 41, should read:

A system for automatically adjusting operation of wipers of a controlled vehicle, comprising:
a controller;
a rain detector adapted for detecting the presence of rain and other water based materials;
one or more proximity detectors configured to detect a proximity of at least one other vehicle to the controlled vehicle, wherein the one or more proximity detectors notify the controller of the at least one other vehicle being in proximity to the controlled vehicle; and
a wiper subsystem including the wipers adapted for adjusting operation of the wipers, wherein
the controller is adapted to adjust the operation of the wiper in response to the rain detector detecting the presence of rain, wherein
the controller is also adapted to control the wiper subsystem based on the detected presence of the at least one other vehicle in the vicinity of the controlled vehicle, such that the operation of the wipers is different than if the at least one other vehicle had not been detected in the vicinity of the controlled vehicle, and to increase the speed of the wipers when the detected proximity of the at least one other vehicle to the controlled vehicle is relatively closer when the rain detector has detected the presence of rain and other water based materials.

Claim 14, Column 10, Line 65, should read:

The system of claim 13, wherein at least one proximity detector uses a sensor adapted for detecting light for detecting the proximity of the at least one other vehicle.

Claim 15, Column 11, Line 1, should read:

The system of claim 13, wherein at least one proximity detector uses a video camera or a laser or radar subsystem for detecting the proximity of the at least one other vehicle.

Claim 17, Column 11, Line 9, should read:

The system of claim 13, wherein the controller is further adapted to, subsequent to increasing the speed of the wipers based on the detected proximity, control the wiper subsystem to decrease the speed of the wipers when the detected proximity of the at least one other vehicle to the controlled vehicle has changed.

Claim 18, Column 11, Line 15, should read:

A method for adjusting operation of wipers of a given vehicle, comprising the steps of:
automatically detecting the presence of rain and other water based materials;
automatically setting the operation of the wipers of the given vehicle based on the detected presence of rain and other water based materials;
automatically detecting the presence of one or more other vehicles in a vicinity of the given vehicle; and automatically adjusting the operation of the wipers of the given vehicle based on the detected presence of the one or more other vehicles in the vicinity of the given vehicle, such that the operation of the wipers is different than if the one or more other vehicles had not been detected in the vicinity of the given vehicle; wherein a controller is adapted to have a wiper subsystem adjust the operation of the wipers in response to detecting that a proximity of the one or more other vehicles has become relatively closer to the given vehicle, and to increase the speed of the wipers when the detected proximity of the one or more other vehicles to the given vehicle is relatively closer when a rain detector has detected the presence of rain and other water based materials.